(12) United States Patent
Newman et al.

(10) Patent No.: US 11,451,949 B2
(45) Date of Patent: Sep. 20, 2022

(54) SIDELINK V2V, V2X, AND LOW-COMPLEXITY IOT COMMUNICATION IN 5G AND 6G

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes Estates, CA (US)

(*) Notice: Subject to any disclaimer, the term of this patent is extended or adjusted under 35 U.S.C. 154(b) by 0 days.

(21) Appl. No.: 17/586,989

(22) Filed: Jan. 28, 2022

(65) Prior Publication Data

US 2022/0159444 A1 May 19, 2022

Related U.S. Application Data

(60) Provisional application No. 63/283,649, filed on Nov. 29, 2021, provisional application No. 63/272,352, (Continued)

(51) Int. Cl.
*H04W 8/00* (2009.01)
*H04L 5/00* (2006.01)
(Continued)

(52) U.S. Cl.
CPC ............ *H04W 8/005* (2013.01); *H04L 5/0048* (2013.01); *H04W 4/029* (2018.02); *H04W 74/0816* (2013.01)

(58) Field of Classification Search
CPC . H04W 8/005; H04W 4/029; H04W 74/0816; H04L 5/0048
(Continued)

(56) References Cited

U.S. PATENT DOCUMENTS 8,520,695 B1 * 8/2013 Rubin .............. G08G 1/096791
370/445
10,159,061 B2 12/2018 Zhao
(Continued)

FOREIGN PATENT DOCUMENTS

CN 114124368 A * 3/2022
WO 2019/235999 12/2019
WO WO-2021188220 A1 * 9/2021

*Primary Examiner* — Mong-Thuy T Tran
(74) *Attorney, Agent, or Firm* — Mayer & Williams PC

(57) ABSTRACT

Sidelink protocols enable user devices to rapidly find, make contact with, and continue communicating with other user devices. For example, vehicles in traffic can communicate on a low-complexity sidelink channel to cooperatively avoid collisions, saving countless lives. Disclosed protocols also enable mobile and IoT devices to form a self-organized temporary local network, independently of base stations. Example messages include a sidelink hailing message configured to discover other user devices, sidelink reply messages indicating the location or identity of each user device, sidelink semaphore messages indicating when each member enters and exits the temporary local network, and extremely fast low-latency emergency communication between vehicles. The disclosed low-complexity protocols may enable cost-constrained use cases that would remain unfeasible under 5G and 6G requirements, absent the systems and methods disclosed herein. For many IoT devices with limited service requirements, the disclosed low-complexity procedures may be enabling.

6 Claims, 8 Drawing Sheets

Related U.S. Application Data filed on Oct. 27, 2021, provisional application No. 63/220,669, filed on Jul. 12, 2021, provisional application No. 63/214,489, filed on Jun. 24, 2021, provisional application No. 63/210,216, filed on Jun. 14, 2021.

(51) Int. Cl.
*H04W 74/08* (2009.01)
*H04W 4/029* (2018.01)

(58) Field of Classification Search
USPC .......................................... 370/329
See application file for complete search history.

(56) References Cited

U.S. PATENT DOCUMENTS

| | | | |
|---|---|---|---|
| 11,057,870 B2* | 7/2021 | Huang | H04W 72/02 |
| 2010/0256852 A1 | 10/2010 | Mudalige | |
| 2013/0063250 A1* | 3/2013 | Raphaeli | G01S 5/0215 |
| | | | 340/10.1 |
| 2019/0007823 A1 | 1/2019 | Kim | |
| 2019/0239040 A1 | 8/2019 | Va | |
| 2019/0320429 A1 | 10/2019 | Xue | |
| 2019/0357126 A1 | 11/2019 | Marinier | |
| 2020/0120730 A1 | 4/2020 | Ryu | |
| 2020/0178039 A1* | 6/2020 | Lee | H04L 5/0055 |
| 2021/0014813 A1 | 1/2021 | Kim | |
| 2021/0058788 A1 | 2/2021 | Su | |
| 2021/0058914 A1 | 2/2021 | Chae | |
| 2021/0096215 A1* | 4/2021 | Slobodyanyuk | G01S 13/89 |
| 2021/0144665 A1 | 5/2021 | Ryu | |
| 2021/0273714 A1* | 9/2021 | Lee | H04B 7/088 |
| 2022/0210815 A1* | 6/2022 | Chen | H04L 1/1607 |

\* cited by examiner

SIDELINK V2V, V2X, AND LOW-COMPLEXITY IOT COMMUNICATION IN 5G AND 6G

PRIORITY CLAIMS AND RELATED APPLICATIONS

This application claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/283,649, entitled "Downlink Demarcations for Rapid, Reliable 5G/6G Messaging", filed Nov. 29, 2021, all of which are hereby incorporated by reference in their entireties.

FIELD OF THE INVENTION

Low-complexity procedures for direct messaging between vehicles and other wireless entities are disclosed.

BACKGROUND OF THE INVENTION

Sidelink communications generally include messaging between wireless entities such as vehicles, sensors, and other devices. In 5G and 6G, sidelink communications are generally managed according to rigid protocols and schedules, either by a base station intermediary or by one of the user devices acting as a temporary base station. Complex protocols are enforced to achieve high performance, low latency, high reliability, and high throughput. However, many emergent applications require minimal communication services, and involve simpler, low-cost devices that may not be able to comply with such complex protocols. Therefore, there is a need for options that enable reduced-capability, low-demand wireless devices to communicate with each other in 5G and 6G networks.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a first user device configured to: broadcast a sidelink hailing message to other user devices in range, the sidelink hailing message comprising an identification code of the particular user device; receive one or more sidelink reply messages transmitted by one or more other user devices responsive to the sidelink hailing message, each sidelink reply message comprising an identification code of the replying user device; record the identification code of each replying user device in computer-readable media; and then communicate with a specific one of the replying user devices.

In another aspect, there is a method for a mobile user device to join a temporary local network comprising a plurality of user devices in wireless communication with each other, the method comprising: receiving at least two semaphore messages transmitted by user devices of the plurality, the semaphore messages transmitted repeatedly according to a predetermined periodicity interval, each semaphore message spaced apart from adjacent semaphore messages by a predetermined spacing interval; determining that a particular semaphore message is followed by a gap without transmission, the gap having a length at least equal to the predetermined spacing interval plus a length of a semaphore message; then waiting the predetermined periodicity interval; and then transmitting a new semaphore message during the gap, the new semaphore message indicating that the mobile user device has joined the temporary local network.

In another aspect, there is a temporary local network comprising a plurality of user devices in radio communication with each other, wherein: each user device is configured to select an identification code different from identification codes of the other user devices of the plurality; each user device is further configured to transmit a first message indicating the selected identification code, the first message transmitted on a sidelink frequency or frequency band allocated for sidelink communications between the user devices; each user device is further configured to receive additional messages from the other user devices of the temporary local network, each additional message specifying an identification code of one of the user devices of the plurality, respectively; and each user device is further configured to record each of the additional identification codes in a computer-readable memory.

In another aspect, there is non-transitory computer-readable media in a wireless user device, the media containing instructions for a method comprising: receiving a sidelink hailing message on a predetermined sidelink frequency; then monitoring the sidelink frequency during a first delay time; if no interference is detected during the first delay time, then transmitting a sidelink reply message on the sidelink frequency.

In another aspect, a first vehicle comprises: a wireless communication system comprising a transmitter and a receiver or a transceiver; and a processor comprising a memory containing instructions that, when executed by the processor, cause the wireless communication system to perform a method comprising: transmitting, on a predetermined frequency, a hailing message comprising a demodulation reference and an indication that the hailing message is a hailing message; receiving, on the predetermined frequency, a hailing response message transmitted by a second vehicle; then transmitting a further message to the second vehicle.

In another aspect, there is a wireless device, comprising a wireless transceiver and non-transitory computer-readable media containing instructions that when executed cause a processor to perform a method comprising: broadcasting a hailing message on a sidelink frequency allocated for sidelink communication; receiving, on the sidelink frequency, a reply message from a second wireless device; recording, in the media, data about the second wireless device; and transmitting, on the sidelink frequency, a unicast message to the second wireless device.

In another aspect, there is a method for a first user device to identify other user devices in radio range of the first user device, the method comprising: transmitting, on a sidelink frequency, a sidelink hailing message comprising an identification code of the first user device; receiving, on the sidelink frequency, one or more sidelink response messages from the other user devices; and determining, from each of the sidelink response messages, an identity code of the responding user device, respectively.

In another aspect, there is a non-transitory computer-readable medium in a first mobile device configured for wireless communication, the medium containing instructions that, when executed by the first mobile device, implement a method comprising: periodically transmitting, on a sidelink frequency, a first semaphore signal comprising at least a demodulation reference signal; and receiving, on the sidelink frequency, a second semaphore signal, transmitted by a second mobile device, and comprising at least a demodulation reference signal.

In another aspect, a user device is configured to transmit a sidelink response message comprising a demodulation reference, an indication that the sidelink message includes an embedded message, and the embedded message.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
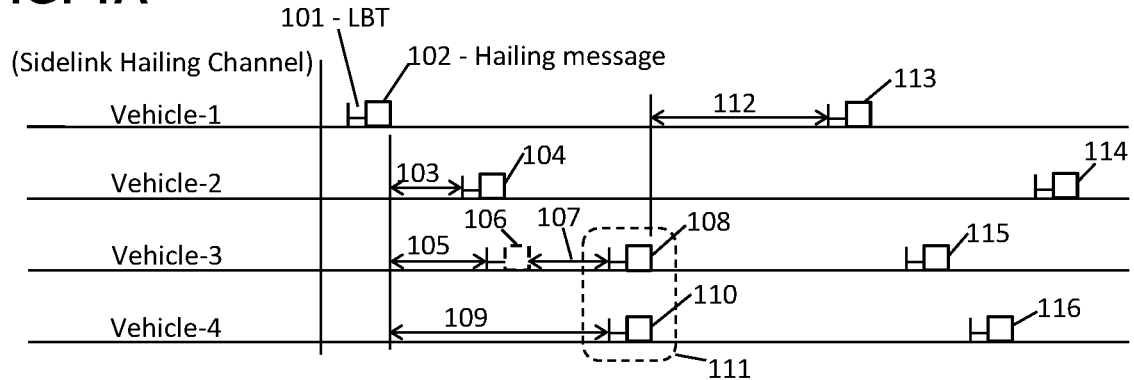
FIG. 1A is a sequence chart showing an exemplary embodiment of a process for a user device to transmit a message to another user device, according to some embodiments.

Embodiments disclosed herein include low-complexity sidelink procedures to enable user devices to rapidly find ("discover") other user devices within radio range, make initial contact with them, and continue communicating wirelessly, without the delays and uncertainty imposed on the high-performance 5G/6G managed channels. Systems and methods disclosed herein (the "systems" and "methods", also occasionally termed "embodiments" or "arrangements", generally according to present principles) can provide urgently needed wireless communication protocols to reduce sidelink access complexity and delays, facilitate sidelink messaging, and provide low-complexity sidelink options to accommodate reduced-capability user devices in 5G and 6G networks, according to some embodiments. The 5G and 6G protocols maximize performance, as measured by high volume capacity, high speed data flow, low latency, and highly reliable communications among wireless devices that are assumed to be highly competent. Complex, compute-intensive procedures are needed to provide such high performance. However, many if not most of the wireless devices expected to participate in the future IoT ("Internet of Things") are low-cost, narrow-bandwidth, reduced-capability devices such as single-purpose sensors and actuators. Many if not most of these applications have minimal communication requirements and may not need the low latency or high reliability or other high-performance features of full 5G or 6G. Versions such as "NB-IoT" ("narrow-band Internet of Things") and "5G-Light" provide partial reduction in bandwidth requirements, but otherwise do little to broaden opportunities for the new applications and devices. An efficient way to accommodate both high-performance users and reduced-capability devices may be to provide low-complexity alternatives and options, in a manner that avoids burdening base stations and avoids interfering with higher-priority users. That is the intent of the procedures presented below.

The disclosed systems and methods are generally intended to facilitate "initialization" which includes a wireless entity or "user device" finding or discovering other user devices, making initial contact with them, receiving and processing a first response message from the other user devices, and further messaging. Optionally, the user devices may form a temporary local network for continuing sidelink communication. Additional user devices, arriving in proximity, may then make connection in the same way and join the temporary local network, while others may leave. In some embodiments, sidelink management is minimal and is performed among the members of the temporary local network, with little or no connection to base stations or the larger network. In some embodiments, low-complexity communications include basic procedures and defaults compatible with simpler devices that require only occasional, brief messaging. The low-complexity procedures, being quicker and simpler than prior-art registration and grant-based access procedures, may enable rapid transfer of emergency messages in hazard situations such as imminent collisions in traffic.

The systems and methods include a "sidelink hailing" message sent by a user device to make initial contact with one or more proximate user devices, and responsive "sidelink reply" messages by those user devices. Further disclosures may include one or more "sidelink semaphore" signals transmitted by user devices in a temporary local network, to assist other user devices in locating and joining the temporary local network. Additional disclosures may include a low-complexity "sidelink channel" with an allocated frequency or frequency band, on which reduced-capability user devices may communicate directly with each other. Further disclosures include message formats such as low-complexity demodulation reference signals and formats, low-complexity sidelink hailing and semaphore message formats, and their responsive reply message formats. In some embodiments, the low-complexity procedures may avoid certain signal processing and computational steps employed in standard 5G and 6G communications such as: "scrambling" in which a message or an error-check code is mixed with an identity code of the intended recipient; "DFT precoding" (discrete Fourier transform); "rate-matching", "bit interleaving", "segmenting", "turbo encoding", "column permutation", and other operations intended to optimize performance for high-end users but may excessively burden reduced-capability user devices. Instead, in examples below, a message may be modulated directly from the plain-text message bits, transmitted on a particular frequency or limited bandwidth, demodulated by the receiver, and interpreted by the receiving entity without further processing. Defaults and standard procedures may be established to simplify low-complexity operations where feasible, such as: including a demodulation reference, with a predetermined format, at the beginning of each message by default; selecting a short-form demodulation reference as the default; providing a gap or space with zero transmission immediately before and after each message; providing a self-selected identification code in a message so that other user devices may receive and record that identification code for later use; include, in transmitted messages, an identification code of the intended recipient, in plain text, in each unicast sidelink message by default; specifying the type of message, in plain text, so the recipient will know how to interpret the message; and other protocols and defaults to enable reduced-capability user devices to communicate with each other.

Terms herein generally follow 3GPP (third generation partnership project) standards, but with clarification where needed to resolve ambiguities. As used herein, "5G" represents fifth-generation and "6G" sixth-generation wireless technology. A managed network (or cell or LAN or local area network or the like) may include a base station (or gNB or generation-node-B or eNB or evolution-node-B or access point) in signal communication with a plurality of user devices (or UE or user equipment or user nodes or terminals) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. In contrast, embodiments described below may include direct user-to-user ("sidelink") communication such as V2V (vehicle-to-vehicle) communication, V2X (vehicle-to-anything), X2X (anything-to-anything, also called D2D or device-to-device) and, when needed, V2N (vehicle-to-network), and transmissions may be asynchronous or "at-will" in some embodiments.

In addition to the 3GPP terms, the following terms are defined herein. Each modulated reference element of a message is referred to as a "symbol" in references, but this may be confused with the same term for a time interval. Therefore, for specificity, each modulated resource element of a message is referred to as a "modulated message resource element" or a "message element" in examples below. For clarity herein, any message or message portion modulated specifically to exhibit the modulation states of the modulation scheme (as opposed to the message data) is referred to as a "demodulation reference", and each resource element of a demodulation reference is a "reference element" herein. A "frequency-spanning" message occupies successive adjacent subcarriers in a single symbol period (or it may continue into the subsequent symbol period if the message is too long to fit in the allocated band). A "time-spanning" message occupies a single subcarrier in successive symbol times. A device "knows" something if it has the relevant information. A device "listens" or "monitors" a channel or frequency if the device receives, or attempts to receive, signals on the channel or frequency. A message is "faulted" or "corrupted" if one or more bits of the message are altered relative to the original message. "Random" and "pseudorandom" may be used interchangeably.

"Low-complexity" refers to devices and procedures necessary for wireless communication, exclusive of devices and procedures providing high-performance communication. 5G and 6G include many procedures and requirements greatly exceeding those necessary for wireless communication, but necessary for high volume at low latency and high reliability. Compared to scheduled and managed 5G/6G messaging, low-complexity procedures generally require less computation and less signal processing. Low-complexity procedures may be tailored to minimize the number of separate operations required of a device. For example, to transmit a data message, user devices in 5G or 6G are required to perform multiple hand-shaking operations with attendant delays, whereas a low-complexity procedure may enable a user device to transmit the data message as soon as it is ready. Consequently, emergency messages may be transmitted faster on a low-complexity channel than on the high-performance scheduled channels, as detailed below.

A "low-complexity channel" refers to a frequency or a band of frequencies allocated for user devices to communicate within certain predetermined limitations. The limitations may include a limit on the size of messages, a limit on the number of messages or volume per day, or a limit on the transmitted power level. Communications on the low-complexity channel may be transmitted at-will or without grant, according to some embodiments. Transmissions may be narrow-band such as 60 or 100 or 150 kHz, single-tone or single-frequency, and time-spanning or frequency-spanning, according to some embodiments. The low-complexity channel may employ a default modulation scheme, such as BPSK (binary phase-shift keying) or QPSK (quadrature phase-shift keying) or 16QAM (quad amplitude modulation with 16 valid states). Low-complexity channels may include a default demodulation reference, according to some embodiments. In some embodiments, messages transmitted by user devices may be managed by a base station using time-alignment messages. In other embodiments, sidelink messages may have no synchronization with, or other involvement with, any base station or other fixed asset of a larger network. In some embodiments, messages on the low-complexity channel may be time-spanning in a first frequency band, and frequency-spanning in a second frequency band. In some embodiments, time-spanning low-complexity messages may begin with a default demodulation reference at any time after an LBT (listen-before-talk interval) in the allocated frequency band. In some embodiments, frequency-spanning low-complexity messages may begin with a default demodulation reference, and/or may start at a particular subcarrier such as the top (highest frequency) subcarrier in the allocated frequency band, for ease of identifying each message.

"Reduced-capability" refers to wireless devices that cannot comply with 5G or 6G protocols, absent the systems and methods disclosed herein. For example, devices are required to receive a multi-MHz bandwidth in order to receive system information messages, and to perform high-speed signal processing to separate and demodulate message elements on a large number of subcarriers. In addition, 5G and 6G messages are generally encoded in multiple ways before transmission. However, each of these steps requires a corresponding reverse process by the receiving device, often at substantially greater effort than the initial encoding, and usually by a device with substantially lower capabilities than the base station. In addition, many standard 5G/6G messages (such as an initial access message, a multiplexed acknowledgement, a demodulation reference signal, among others) may be converted into a much longer sequence of encoded bits for orthogonality. A reduced-capability device, on the other hand, may not need the high performance gained by such procedures, and may be incapable of performing them. A reduced-capability device may be able to receive a narrow-band wireless signal, demodulate the message, and interpret the content without further processing. Application developers in cost-constrained use cases will demand easier ways to access networks, using protocols appropriate to the simpler devices. The following examples are aimed at fulfilling that need.

The systems and methods disclosed herein include low-complexity sidelink messages. Prior art includes a "sidelink resource-allocation mode 1" in which a base station acts as a manager for setting up a sidelink resource grid and issuing sidelink control signals, and "sidelink resource-allocation mode 2" in which one of the user devices sets up the sidelink resource grid and issues sidelink control signals. In contrast, disclosed herein is a "sidelink resource-allocation mode 3" in which user devices may communicate according to low-complexity protocols, without base station involvement. User devices may spontaneously form a "temporary local network" of user devices in radio range of each other and communicating according to the low-complexity sidelink resource-allocation mode 3 as described below. However, if a particular user device in the temporary local network requires higher performance, it may transition to a managed network, if available.

Exemplary use cases for low-complexity communication are replete. A sensor that includes a wireless transceiver may transmit an occasional sidelink message to another sensor or to a supervisory controller. Vehicles in traffic may communicate with each other, form a temporary local network among themselves, cooperate to manage any emergencies that may arise, and then drift out of the temporary local network. Pedestrians, industrial actuators, mobile robots, and innumerable other IoT applications involve multiple user devices distributed and variable over time, communicating with little or no human interaction in most cases, and autonomously determining which other wireless devices are within radio range by exchanging sidelink hailing or semaphore messages. If one of the devices requires information or messaging performance or access beyond the temporary local network, it can upgrade to the sidelink resource-allocation mode 2 or, if a base station is available, to sidelink resource-allocation mode 1, and continue on the scheduled high-performance channels. In summary, sidelink resource-allocation mode 3 may enable direct communication between reduced-capability user devices at short range using low-complexity protocols, configured to avoid interfering with concurrent activity on scheduled channels.

Turning now to the figures, the systems and methods include a sidelink "hailing" message, which a user device broadcasts to invite other user devices to reply.

FIG. 1A is a sequence chart showing an exemplary embodiment of a low-complexity procedure for a user device to transmit a sidelink hailing message, according to some embodiments. A sequence chart is a graphic showing signals or actions of various entities versus time, with one horizontal line for each entity. Dotted arrows indicate causation or simultaneity. Messages in sequence charts are generally depicted as time-spanning for clarity, but in many cases they may be frequency-spanning as well. As depicted in this non-limiting example, four horizontal lines show messages of four user devices configured as vehicles, Vehicle-1, 2, 3, and 4, on a particular sidelink hailing channel, that is, a frequency or frequency band allocated for low-complexity sidelink hailing messages, among other sidelink communications. (The user devices are referred to as vehicles here for visualization, but they may be any type of wireless devices, including pedestrians with communicators, immobile wireless sensors and actuators, industrial robots, intelligent flower pots, or other wireless devices.) A low-complexity sidelink hailing message is a message broadcast by one user device to elicit reply messages from other user devices within range. The hailing and reply messages may include an identification code so that the devices may form a temporary local network and continue communicating with each other. The hailing messages may be repeated periodically to monitor the comings and goings of the various members.

In the depicted example, Vehicle-1 first monitors the sidelink hailing channel during an LBT interval 101 (as indicated by a bar here and elsewhere, not specifically called out), and then transmits a sidelink hailing message 102 if the channel remains clear for the LBT time 101. The sidelink hailing message 102 is received by the other vehicles, and they reply after a "reply delay", which is configured to avoid collisions among the replying users. For example, the reply delay may be a randomly selected delay, or it may be related to the received power (such as delaying shorter if the received power is higher, and delaying longer if the received power is lower), or otherwise determined. In this example, the vehicles delay for random intervals. Vehicle-1 delays for a brief delay 103 and then transmits a sidelink hailing reply message 104 after an additional LBT interval. Vehicle-3 also delays 105 before responding, but in this case Vehicle-3 detects the Vehicle-2 transmission 104 during an LBT interval. Therefore, Vehicle-3 skips (withholds) its transmission 106 (in dash) to avoid a collision, and instead performs another delay 107, and then transmits a reply 108. Vehicle-4 delays 109 and then transmits its reply 110. However, in this case, the two messages 108 and 110 happen to start at the same time, causing a message collision. LBT intervals can avert most message collisions, but not all. If two entities happen to begin transmitting simultaneously, their messages will collide (also called a "coincident collision" between messages).

In the depicted example, Vehicle-1 detects the collision 111 between Vehicles 2 and 3. Vehicle-1 therefore delays 112 for a time sufficient to allow any further replies to finish, and then transmits another sidelink hailing message 113. The other vehicles again reply 114, 115, 116, but this time they all select different random delay times, and therefore do not collide. In this example, each user device has selected a different identification code and has included its identification code in the sidelink hailing message 102 and in each sidelink reply message. The four vehicles receive each other's messages, determine the wireless identification codes of the other vehicles, record those codes in memory, and thereby establish a small temporary local network spontaneously. The participants can then transmit messages directly to each other on the sidelink hailing channel. Alternatively, they may switch to another sidelink channel allocated for sidelink communications other than hailing messages, to keep the sidelink hailing channel clear.

Another user device may join the temporary local network by responding to the sidelink hailing message 102 or 113 or to a later sidelink hailing message. Alternatively, a new user device may transmit a sidelink hailing message itself, so long as its hailing message includes its identification code and avoids interfering with the other sidelink messages. In some embodiments, a user device that is transmitting sidelink hailing messages may detect another device's hailing message, and then may cease transmitting hailing messages to avoid unnecessary redundancy, since a single series of hailing messages may be sufficient to identify the members. A member of the temporary local network may exit by passing out of range, and the other members may determine that one has exited by its lack of response to hailing messages. The temporary local network is thus a loose and fluid temporary communication agreement among user devices, so that they can communicate directly among themselves, independent of any base stations or other fixed assets of a wider managed network, according to some embodiments.

In some cases, a user device in a temporary local network may wish to transmit messages larger than some limit, or with higher reliability, or may otherwise require the advantages and performance that 5G or 6G can provide on the scheduled and managed channels. In that case, the user device may upgrade its mode of operation. For example, a user device may upgrade to the resource-allocation mode 2 by transmitting a standard sidelink system information message (S-SSB, sidelink system synchronization block) on the SS/PBSCH (sidelink synchronization physical broadcast sidelink channel), thereby establishing a sidelink resource grid and timing, administered by the initiating user device. Alternatively, if a base station is within range, the user device may initiate resource-allocation mode 1 by joining the base station's resource grid. That base station may then manage further sidelink communications on the scheduled sidelink channels. Other user devices of the temporary local network may receive those messages and, if they are capable of performing the mode upgrading procedures and wish to do so, may then join the upgraded and synchronized network. However, the less-capable devices, or any user that is content with short and infrequent at-will messaging, may remain on the temporary local network using the low-complexity procedures. In each case, the sidelink frequency or frequency band may be configured to not overlap with, or otherwise interfere with, the SS/PBCH and the other scheduled channels, so that the low-complexity users and high-performance users may coexist without interference.

Figure 1B:
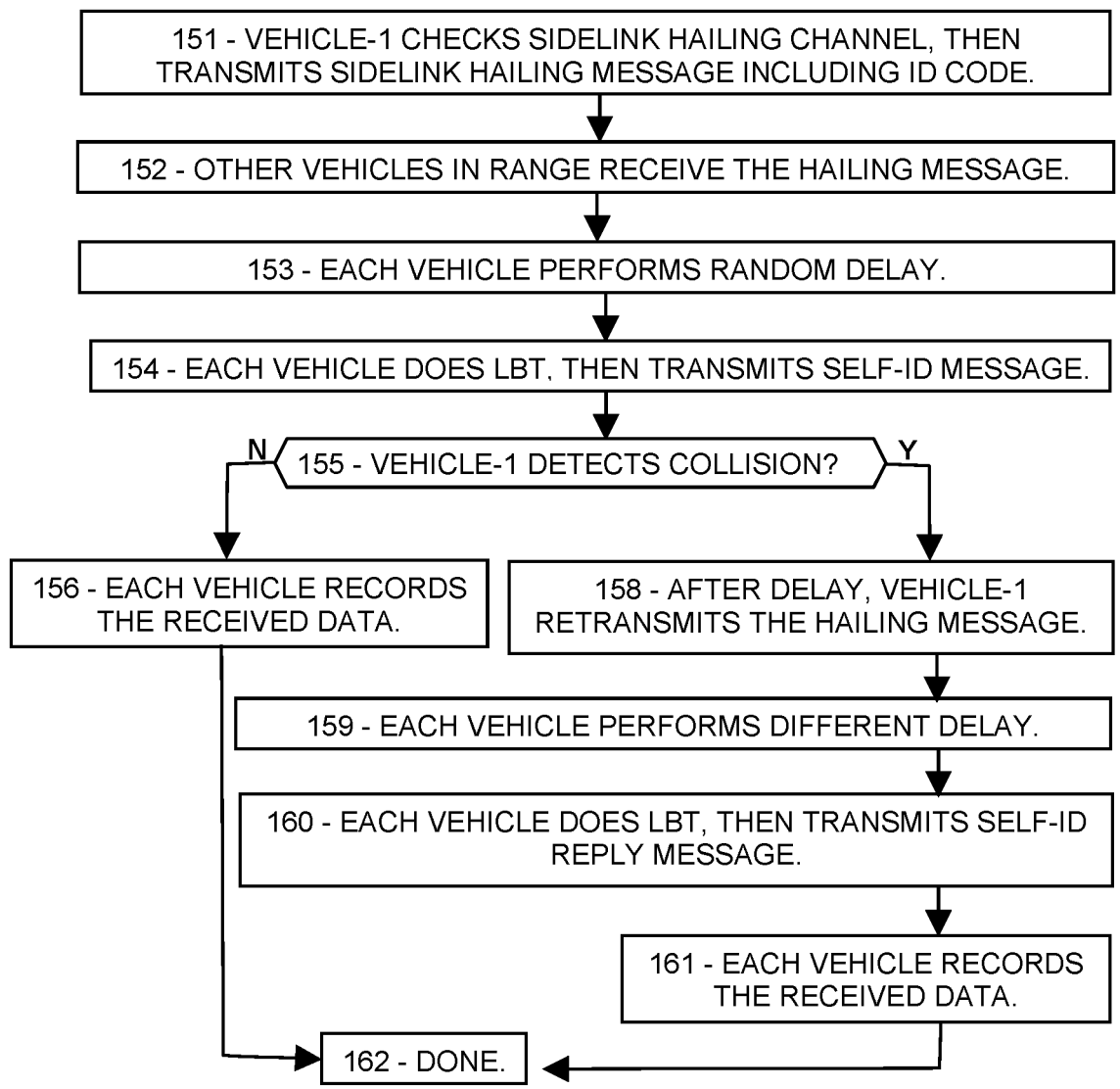
FIG. 1B is a flowchart showing an exemplary embodiment of a process for a user device to transmit a message to another user device, according to some embodiments.

FIG. 1B is a flowchart showing an exemplary embodiment of a low-complexity procedure for user devices, such as vehicles, to communicate directly with each other, according to some embodiments. The user devices may alternatively be mobile industrial robots communicating to coordinate warehouse/factory/construction operations with each other, or non-mobile IoT sensors that spend most of their time non-communicative, as in discontinuous reception (DRX), among innumerable other applications for low-complexity sidelink communications.

As depicted in this non-limiting example, at 151, a first user device, depicted as a first vehicle, checks a sidelink hailing channel for interference during an LBT interval, and then transmits a sidelink hailing message to determine which other vehicles (or other wireless user devices) are in range. The sidelink hailing message includes an identification code of the hailing vehicle in this case. At 152, each other vehicle receives the sidelink hailing message and, at 153, performs a randomly selected delay plus a listen-before-talk delay to avoid message collisions. (Optionally, the listen-before-talk interval may be included in the randomly selected delay, so long as the vehicle monitors the sidelink channel for a sufficient time to detect cross traffic before transmitting.) Other vehicles in range then transmit reply messages indicating their own identification codes at 154. The identification codes may be randomly determined, or self-selected by each vehicle, or assigned, or related to the vehicle's MAC address, for example. The other vehicles receive those reply messages and record the identification codes in, for example, a computer memory, so that they can transmit unicast messages to specific other user devices in the future. In addition, the vehicles may note that one of the vehicles has stopped replying to hailing messages, and may delete that identification code from memory after some predetermined number of reply failures.

At 155, the first vehicle receives the various reply messages and determines whether a message collision has occurred. For example, the first vehicle may check a parity code included in each reply message, or it may detect illegal modulation states, or otherwise detect a fault. If no message collision is detected at 156, the hailing procedure is done at 162. But if a message collision is detected, then the first vehicle may wait a delay to allow any remaining replies to come in, and then may re-transmit the hailing message at 158. In response at 159, each of the other vehicles again selects a random delay (different from the first delay), and at 160 re-transmits its reply message with its identification code. Assuming that no further message collisions have occurred on the second attempt, each vehicle records 161 the identification codes of the other vehicles (if not already done so) for future unicast messaging, and is done 162. The participating vehicles (or other types of user devices) may then communicate on the sidelink channel at-will. For example, a user device may transmit a unicast message that includes the ID code of the intended recipient. Alternatively, a vehicle may broadcast a message to all the participants by setting the recipient identification code in the message to zero, or other special value.

The user devices may be configured to change their self-selected identification codes if two of the user devices happen to have the same code. For example, upon receiving a hailing message, a first vehicle may transmit its reply message including its self-selected identification code, and a second vehicle may detect that reply message and may determine that the first vehicle has the same identification code as the second vehicle. By chance, the two vehicles have selected the same identification code. In that case, the second vehicle may select a different identification code, so that each of the members of the temporary local network will then have different identification codes. The second vehicle may then reply to the hailing message, using its new identification code in its reply message, thereby informing the other members of its new code. In addition, the second vehicle may include a special flag or format in its reply message, indicating that its identification code has changed. Alternatively, the second vehicle may transmit unicast messages to other vehicles informing them of the code change. In addition, the second vehicle may transmit a message to the first vehicle informing it of the problem, so that both vehicles can pick new codes, thereby retiring the conflicted code to avoid further confusion. Thus each user device in a temporary local network can change its identification code when it detects another user with the same code, and may thereby arrange that the members of the temporary local network all have distinct identification codes. In some embodiments, the identification codes are long enough that such coincidences are rare, yet short enough that messaging is not unduly burdened. For example, the identification code may have 8 or 12 or 16 or 20 bits, in some embodiments.

An advantage of allocating a frequency channel for unscheduled low-complexity sidelink messages may be to enable reduced-capability devices to communicate directly with each other while avoiding complex 5G/6G procedures, especially when high-performance communication is not needed. Another advantage may be to enable mobile devices, such as vehicles, to maintain contact with other vehicles within range. A further advantage may be to enable the vehicles to mutually update the identities of the participating vehicles in real-time, as various members transition into and out of range of each other. An advantage of providing an unscheduled contention-based channel for sidelink communication may be to enable low-complexity communication. Another advantage may be to enable communication without burdening base stations and without interfering with high-performance user devices. A further advantage may be that a user device which is capable of 5G and 6G protocols, and wishes to avail itself of the high performance services of scheduled sidelink communication, may upgrade to resource-allocation mode 2 or, assuming a base station is within range, to resource-allocation mode 1.

Another advantage may be that the depicted low-complexity procedures may be compatible with devices that may have difficulty complying with prior-art 5G or 6G registration procedures. Another advantage may be that the depicted procedures may be implemented as a software (or firmware) update, without requiring new hardware development, and therefore may be implemented at low cost, according to some embodiments. The disclosed procedures may be implemented as a system or apparatus, a method, or instructions in non-transitory computer-readable media for causing a computing environment, such as a user device, a base station, or other signally-coupled component of a wireless network, to implement the procedure. As mentioned, the examples are non-limiting. Other advantages may be apparent to skilled artisans after reading this disclosure. The advantages in this paragraph may apply equally to other lists of advantages provided with examples below. Particular embodiments may include one, some, or none of the above-mentioned advantages.

Figure 2A:
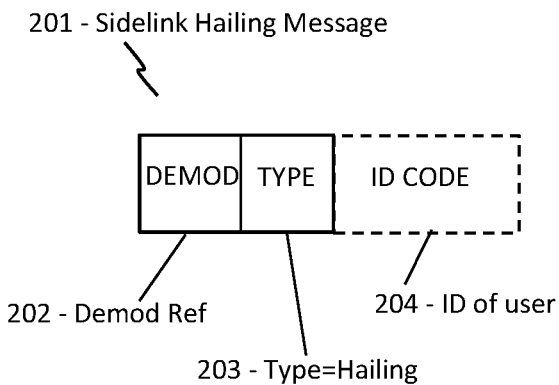
FIG. 2A is a schematic sketch showing an exemplary embodiment of a sidelink hailing message, according to some embodiments.

FIG. 2A is a schematic showing an exemplary embodiment of a low-complexity sidelink hailing message, according to some embodiments. As depicted in this non-limiting example, the sidelink hailing message 201 may be a short message transmitted by one user device to request responses from other user devices in range, without participation by a base station or other network assets. The sidelink hailing message 201 in this case includes a demodulation reference 202, a message-type field 203 indicating that the message is a sidelink hailing message, and, optionally, the identification code 204 of the hailing user device. The demodulation reference 202 is a field including reference elements modulated according to the same modulation scheme as the rest of the message, and configured in a predetermined way so that the receiving entity can use the demodulation reference for demodulating the rest of the message. For example, the demodulation reference 202 may include two reference elements, including a first reference element modulated according to the maximum amplitude level and the maximum phase level of the modulation scheme, and a second reference element modulated according to the minimum amplitude level and the minimum phase level of the modulation scheme. The receiving entity may receive the demodulation reference 202, and may calculate any remaining intermediate amplitude and phase levels by interpolation between the maximum and minimum amplitude and phase levels exhibited in the reference elements. The receiving entity can then compare the amplitude and phase values of each message element to the amplitude and phase levels exhibited in the demodulation reference 202, or calculated from the exhibited levels. Some modulation schemes, such as QPSK have phase modulation but not amplitude modulation. In that case, the maximum and minimum amplitude levels are the same. As an alternative, the first reference element may exhibit the minimum amplitude level and the maximum phase level, while the second reference element may be modulated according to the maximum amplitude and minimum phase, or other equivalent combinations.

The receiving user devices may adjust their time-base and frequency according to the timing and frequency of the demodulation reference 202. The user devices may thereby arrange that subsequent messages transmitted by each of the members of a temporary local network may become synchronized and compatible with each other.

The examples refer to a standard modulation scheme of separate amplitude and phase modulation multiplexed in each message element. Alternatively, the message may be modulated according to PAM or pulse-amplitude modulation, in which two signals are separately amplitude modulated and then combined with a 90-degree phase difference. For the purposes of the present disclosure, those and other modulation schemes involving amplitude and/or phase modulation are equivalent. It is immaterial which type of modulation scheme is employed, as long as the receiving entity knows how to demodulate and interpret the message.

Figure 2B:
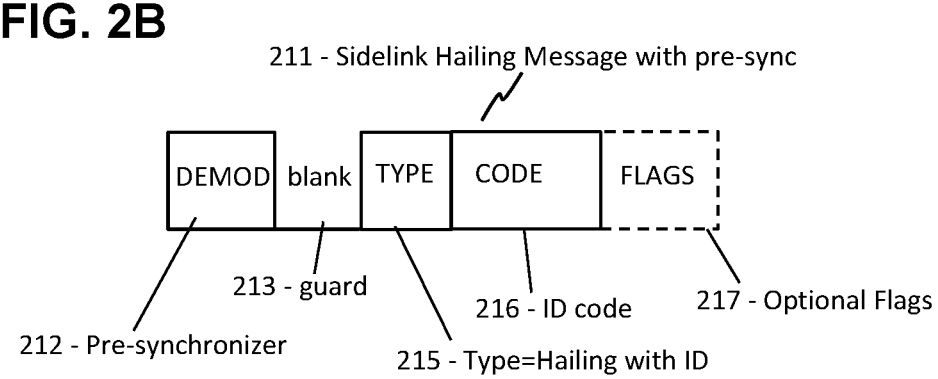
FIG. 2B is a schematic sketch showing an exemplary embodiment of another sidelink hailing message, according to some embodiments.

FIG. 2B is a schematic showing an exemplary embodiment of a low-complexity sidelink hailing message with a pre-synchronization field and other optional fields, according to some embodiments. As depicted in this non-limiting example, the sidelink hailing message 211 may include a "pre-synchronizer" 212, such as a leading demodulation reference followed by a blank or guard space 213. The guard space 213 may have no transmission, or unmodulated carrier, or other signal not resembling data. The guard space 213 is followed by a message-type field 215 indicating that the message is a hailing message with identification, followed by the identification code 216 of the hailing user device, and then optionally a set of flags 217 or other data. The pre-synchronizer field 212 and the guard space 213 may enable reduced-capability user devices to adjust their timing and frequency and modulation levels before receiving the rest of the message, and may thereby provide improved demodulation and interpretation of the information in the message. The optional flags 217 may provide extra information such as whether the hailing message 211 is an emergency, among other options.

Figure 2C:
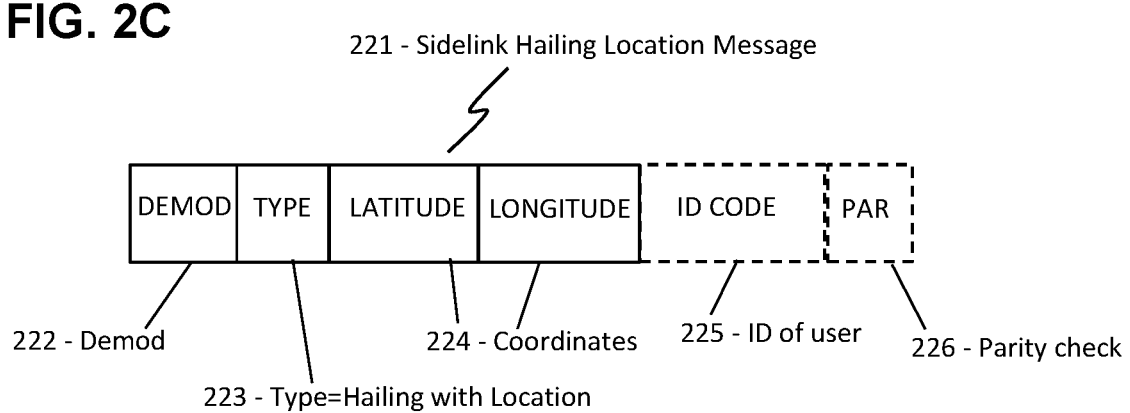
FIG. 2C is a schematic sketch showing an exemplary embodiment of a sidelink hailing location message, according to some embodiments.

FIG. 2C is a schematic showing an exemplary embodiment of a low-complexity sidelink hailing message with a location field and other optional fields, according to some embodiments. As depicted in this non-limiting example, the sidelink hailing message with location 221 may include a demodulation reference 222, a message-type field 223 indicating the type of message, coordinates 224 such as the latitude and longitude of the hailing user device (or codes representing the coordinates), or other type of location indicator. Optional fields may include the identification of the hailing user device 225 and an error check 226 such as a parity check or CRC (cyclic redundancy code) or the like. Receiving user devices, such as vehicles, may record the location information in a memory, associated with the identification code of the transmitting vehicle, and may thereby determine the identification of each vehicle in proximity. Such information may be useful in, for example, collision-avoidance software, or operations management routines at an industrial site, among many other applications.

An advantage of broadcasting sidelink hailing messages independently of base stations may be that mobile user devices, such as vehicles, may thereby exchange information and cooperate in avoiding vehicle collisions, among many other applications of low-complexity sidelink communication. Another advantage may be that an emergency message may be transmitted much sooner using the low-complexity procedures than with the high-performance scheduled channels, because the low-complexity procedures depicted may avoid the time-consuming 5G/6G procedures associated with obtaining permission to transmit on the high-performance channels. In the low-complexity example, on the other hand, the user device transmits the emergency message as soon as the hazard is detected. The low-complexity emergency message may thereby initiate cooperative action with other vehicles much sooner than with the managed and scheduled 5G and 6G resources.

An advantage of providing the identification of the hailing user device in the sidelink hailing message may be that other user devices may record that identification code in, for example, a memory, and may subsequently transmit messages specifically to the hailing user device. Likewise, the replying user devices may include their identification codes in their replies, so that the other user devices may record those identification codes and subsequently communicate with those devices as well. An advantage of providing a demodulation reference at the head of the message may be that other user devices may thereby adjust their timing, frequency, and modulation levels for improved reception of the remaining elements of the message. An advantage of leaving a blank gap or space between the demodulation reference and the rest of the message may be that the gap interval may clearly indicate the start and end of the message. Likewise, an advantage of leaving a blank gap between the demodulation reference and the rest of a frequency-spanning message may be to assist low-complexity devices in separately determining the modulation levels of the reference elements. An advantage of providing optional flags may be that the receiving user devices may thereby determine how to respond to the hailing message, such as by treating it as an emergency message. An advantage of providing the location coordinates of the hailing user device may be that the other user devices can thereby determine where the hailing user device is positioned relative to themselves, which may be especially useful in vehicle traffic situations. An advantage of providing an error-check field may be that the receiving user devices may thereby determine whether the message had been altered by noise or interference.

The systems and methods further include a low-complexity sidelink hailing reply message, which is a message transmitted by a user device responsive to a sidelink hailing message.

Figure 2D:
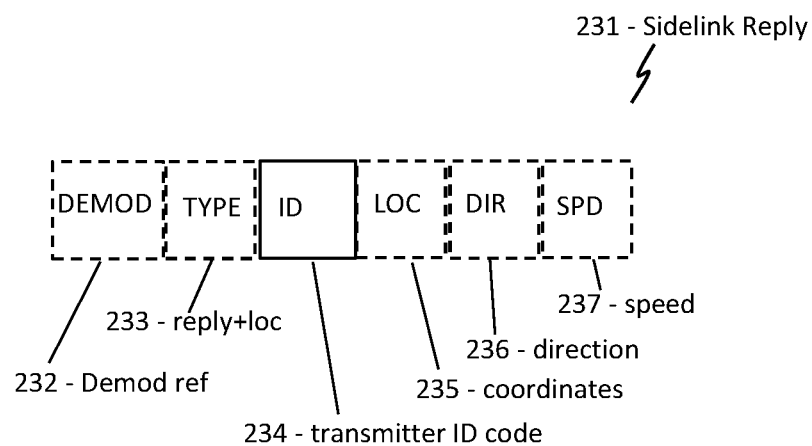
FIG. 2D is a schematic sketch showing an exemplary embodiment of a sidelink response message, according to some embodiments.

FIG. 2D is a schematic showing an exemplary embodiment of a low-complexity sidelink hailing reply message, according to some embodiments. As depicted in this non-limiting example, the sidelink hailing reply message 231 may be a short message transmitted by one user device in response to another user device's sidelink hailing message, or other broadcast message requesting a response, without participation by a base station or other network assets. The sidelink hailing reply message 231 in this case includes an optional demodulation reference 232, an optional message-type field 233 indicating that the message is a sidelink hailing response, and the identification code 234 of the responding user device. The message 231 may optionally include the location 235 of the replying user device, its direction and speed 236-237, and/or other possible options.

In some embodiments, a user device replying to a hailing message may adapt its response format to the initial message, such as including its location in the reply message only if the hailing message also provides the location of the transmitting entity, or including its identification code in the reply message only if the hailing message does the same.

Figure 2E:
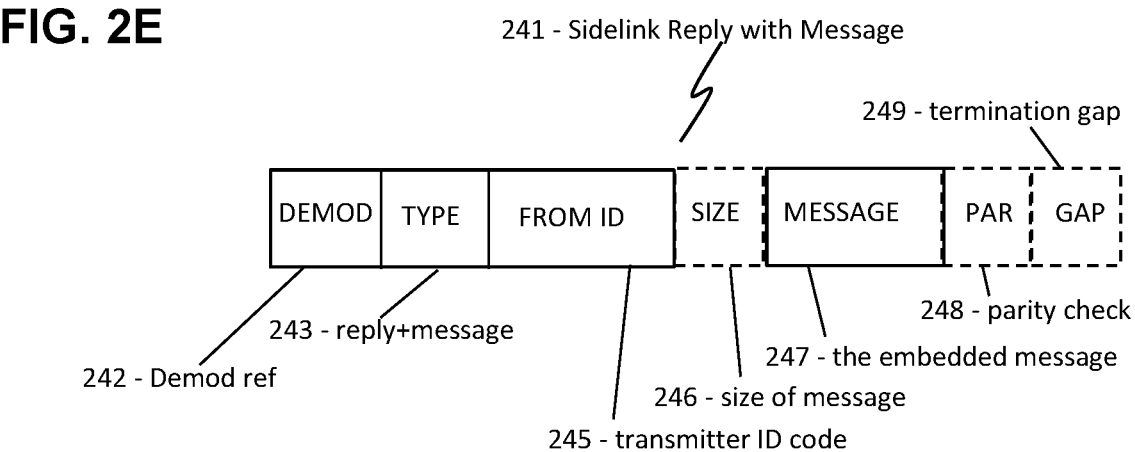
FIG. 2E is a schematic sketch showing an exemplary embodiment of a sidelink response message including an embedded message, according to some embodiments.

FIG. 2E is a schematic showing an exemplary embodiment of a low-complexity sidelink hailing reply message that contains an embedded message, according to some embodiments. As depicted in this non-limiting example, the sidelink hailing reply message 241 may include a leading demodulation reference 242, a message-type field 243 indicating that the message is a hailing response with embedded message, the responding user device's identification 245, and then optionally a size field 246 indicating the size of the embedded message, the embedded message 247, and optionally an error check 248 such as a parity check for example, followed by a final termination gap 249. The embedded message 247 may include whatever the responding user device wishes to convey to the hailing entity. For example, in a traffic emergency situation or other emergency requiring instant communication between members of a temporary local network, the fastest way to communicate the emergency message may be to embed it in a hailing response, thereby avoiding the access procedures of the 5G and 6G scheduled channels.

The reply message 241 is actually a unicast message since it is intended for the hailing user device, but it does not need a destination address because the message-type field 243 indicates that the message is a reply. If, however, the message-type field does not specify that, or is omitted, the ID code of the hailing user device may be included. Size limitations may apply; larger messages may be better served as a separate transmission after the response message. As mentioned, the example is non-limiting; artisans may devise other response messages with other fields and other sizes, without departing from the spirit of the appended claims.

An advantage of transmitting a sidelink hailing reply message may be that mobile user devices, such as vehicles, may thereby determine which other vehicles in the vicinity are capable of wireless communication. An advantage of including location data in the reply message may be that the other user devices may determine the positions of other user devices relative to themselves. An advantage of providing the direction and speed of travel may be that other user devices may input that data to their driver-assistance programs and thereby obtain better detection of potential threats sooner than otherwise. An advantage of including an embedded message in a response may be that the user devices may thereby communicate and exchange information without performing complex registration procedures. An advantage of disclosing the size of the embedded message may be to assist the receiving user devices in receiving the message. As mentioned, the examples depicted in FIGS. 2A, 2B, 2C, 2D, and 2E are non-limiting; artisans may devise other hailing messages with location data, or other fields, without departing from the spirit of the appended claims.

The systems and methods further include a sidelink semaphore message, which is a short message that user devices in a temporary local network may transmit periodically to determine which devices remain in range.

Figure 3A:
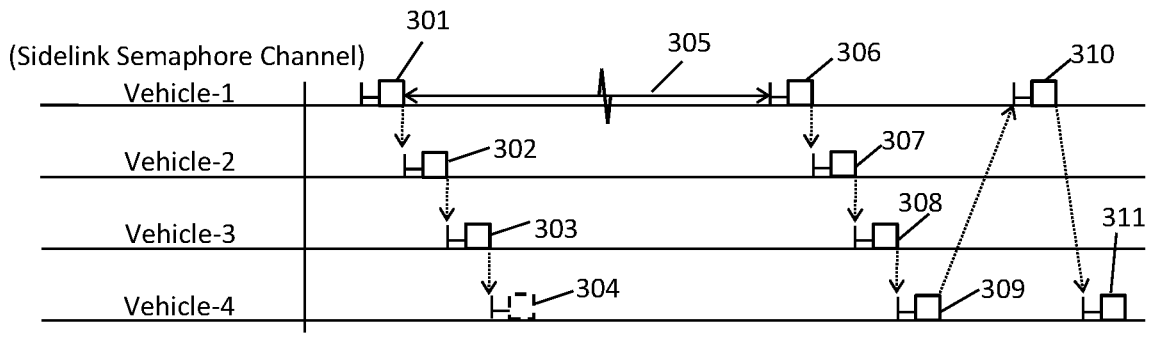
FIG. 3A is a sequence chart showing an exemplary embodiment of a process for a user device to join a temporary local network, according to some embodiments.

FIG. 3A is a sequence chart showing an exemplary embodiment of a low-complexity procedure for a plurality of user devices (labeled as vehicles in this example) to transmit semaphore messages on a sidelink channel, according to some embodiments. The horizontal lines show messages transmitted by each of Vehicles 1, 2, 3, and 4. The user devices (such as vehicles in traffic) form an ad hoc device-to-device temporary local network, not involving a base station. Each vehicle transmits a sidelink semaphore message sequentially, to determine which members remain within range. Other user devices can join the temporary local network by transmitting a sidelink semaphore message after the existing members have done so.

As depicted in this non-limiting example, Vehicles 1, 2, and 3 are members of the temporary local network. They transmit semaphore messages 301, 302, and 303 sequentially on a particular sidelink channel, each transmission after an LBT interval (short bar, not specifically labeled) which also serves as a guard interval to prevent overlap of the various signals due to effects such as transit time variations and the like. The sequence of semaphore messages is then repeated periodically, each cluster or session of semaphore messages including semaphore messages from the members of the temporary local network. Vehicle-4 is within radio range but is not yet a member. Vehicle-4 receives the semaphore messages, and thereby determines that the next semaphore "position" (or time slot), after the Vehicle-3 semaphore 303, is unoccupied, as indicated by the dashed symbol 304. Therefore Vehicle-4 decides to join the ad hoc network by transmitting its semaphore signal at that unoccupied position upon the next session of semaphore messages.

The vehicles repeat their semaphore messages 306, 307, 308 after a predetermined interval 305 or "periodicity delay" between successive sessions of semaphore messages. The periodicity delay 305 is generally much longer than shown in the chart, but has been shortened here as suggested by a jagged line. Vehicle-4 then detects the Vehicle-3 semaphore message 308, and (after an LBT interval), Vehicle-4 transmits its semaphore message 309 in the formerly unoccupied position. The semaphore message 309 from Vehicle-4 thereby informs the other vehicles that it has joined. In this case, each semaphore message includes an identification code so that each member can transmit unicast messages to another member of the ad hoc network, now including Vehicle-4. Subsequently, Vehicle-4 transmits a data message 310 to Vehicle-1, during the periodicity delay time between sessions of semaphore messages. The data message 310 may be an information message, or an alert that a hazard is approaching, or other data. Vehicle-4 knows that Vehicle-1 will receive the data message 310 because the data message 310 is transmitted on the same channel as the semaphore messages. Responsive to the data message 310, Vehicle-1 then sends an acknowledgement message 311 back to Vehicle-4 on the same channel.

The predetermined periodicity delay 305 between semaphore sessions may be short enough that changes in the temporary local network, such as a member passing out of range, can be detected, but long enough to allow other messages to be transmitted on the same channel between semaphore occasions. For example, the periodicity delay may be 5 or 10 or 100 milliseconds, or 1 or 5 or 10 seconds. The periodicity delay may be selected according to how quickly the user devices typically pass into and out of the group, among other inputs. In addition, if a data message is ongoing when another semaphore session is due, the user devices may detect the ongoing message and refrain from transmitting their semaphore messages at that time. Thus the other messages on the sidelink channel may take precedence over the semaphore messages.

Figure 3B:
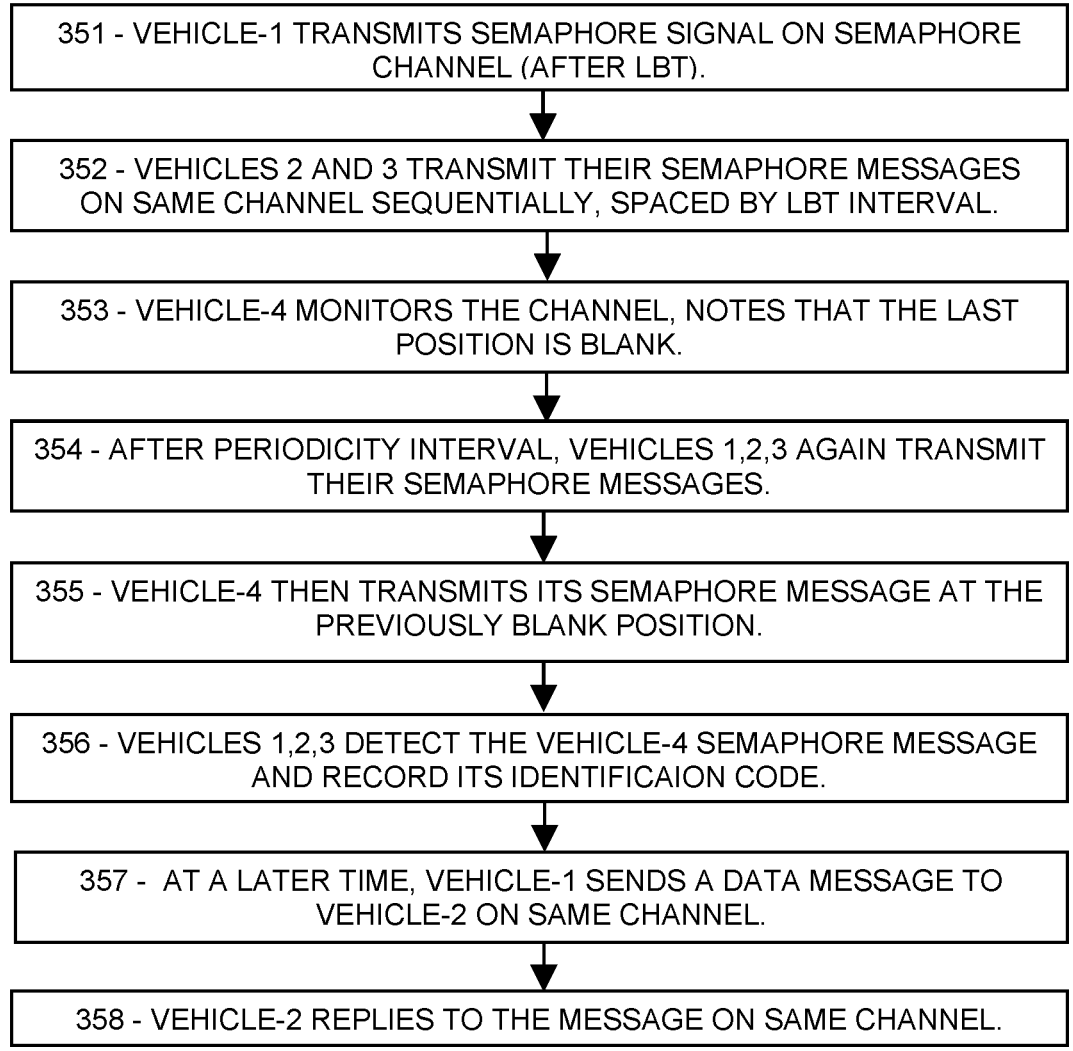
FIG. 3B is a flowchart showing an exemplary embodiment of a process for a user device to join a temporary local network, according to some embodiments.

FIG. 3B is a flowchart showing an exemplary embodiment of a low-complexity procedure for a plurality of user devices in a temporary local network to transmit semaphore messages on a sidelink channel, according to some embodiments. As depicted in this non-limiting example, at 351, a first vehicle transmits a semaphore message on a predetermined semaphore channel that is shared by a plurality of other vehicles in range. Each semaphore message includes an identification code of the transmitting user device. Each semaphore message is preceded by a predetermined listen-before-talk interval. At 352, Vehicles 2 and 3 transmit their semaphore messages with LBT spaces between them. The various vehicles may have previously arranged to transmit in an order that avoids message collisions. At 353, another user, Vehicle-4, receives the semaphore messages and observes that the space or position after the Vehicle-3 semaphore is blank. At 354, after a periodicity delay (1 second in this case), Vehicles 1, 2, and 3 again transmit their semaphore messages, after which Vehicle-4 transmits its semaphore message in the previously blank position. Vehicle-4 thereby joins the temporary local network at 355 by informing the other members of its identification code. At 356, the other vehicles detect Vehicle-4's semaphore message and record its identification code, so that they may communicate unicast in the future. At 357, during the periodicity interval between semaphore sessions, Vehicle-1 transmits a message to Vehicle-2 on the same channel, and Vehicle-2 replies at 358 with another message on the same channel, thereby continuing the communication. If one of those messages happens to overlap the next round of semaphore messages, the other vehicles may detect the ongoing transmission during their LBT intervals, and may therefore refrain from transmitting their semaphore messages, to avoid colliding with the ongoing message. Unicast messages thus have priority over semaphore messages in this example. On the other hand, a member device wishing to transmit a message may avoid beginning its transmission at the same time that the next semaphore session is scheduled, to avoid collisions.

An advantage of providing a low-complexity sidelink channel on which multiple user devices may transmit semaphore messages specifying their identification codes, may be that the user devices may thereby learn the identification codes of other nearby user devices, and may then communicate with another user device individually by including the recipient's identification code in the message. Another advantage may be that reduced-capability devices may engage in sidelink communication using low-complexity procedures on the sidelink channel while avoiding complex procedures and requirements of the scheduled channels. An advantage of spacing the semaphore messages apart by a listen-before-talk interval may be that message collisions may be avoided. Another advantage may be that a newly arriving user device may determine which semaphore positions are unoccupied, and therefore may begin transmitting its own semaphore message in the unoccupied position. An advantage of spacing the semaphore sessions apart by a substantial periodicity delay, such as 0.1 or 1 or 10 seconds for example, may be that the participating user devices may have time to transmit messages other than semaphore messages during that delay.

Figure 4A:
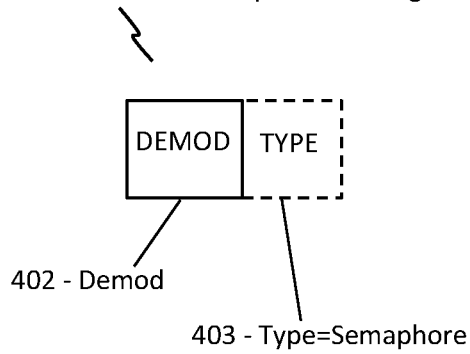
FIG. 4A is a schematic sketch showing an exemplary embodiment of a sidelink semaphore message, according to some embodiments.

FIG. 4A is a schematic sketch showing an exemplary embodiment of a low-complexity sidelink semaphore message, according to some embodiments. As depicted in this non-limiting example, a basic sidelink semaphore message 401 may include a demodulation reference 402, and an optional message-type field 403 indicating that the message is a basic sidelink semaphore message. In this example, the identification code is not needed because the identification codes of each member of the temporary local network have been specified in previous semaphore messages, and the identity of each member can be determined from the position of its semaphore message in the sequence. For the same reason, the message-type code 403 may be omitted. The demodulation reference 402 at a given member's position in the sequence may thereby indicate that the member is still present.

Figure 4B:
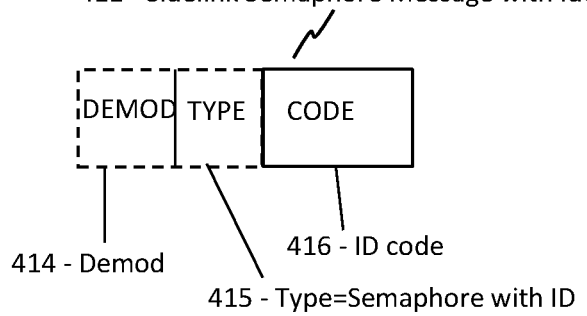
FIG. 4B is a schematic sketch showing an exemplary embodiment of a sidelink semaphore message including identification, according to some embodiments.

FIG. 4B is a schematic sketch showing an exemplary embodiment of a low-complexity sidelink semaphore message including identification, according to some embodiments. As depicted in this non-limiting example, a sidelink semaphore message with identification 411 may include an optional demodulation reference 414, an optional message-type field 415 indicating the message type, and an identification code 416 of the transmitting user device. The identification code 416 may be a self-selected number such as a random number, of a predetermined length such as 8 or 12 or 16 bits for example. Each user device in the temporary local network may then communicate directly with other members by transmitting unicast messages including the identification code of the intended recipient. The demodulation reference 414 and the message-type field 415 may be omitted because the ID code 416 at a particular sequence location may affirm the continuing presence of the vehicle with that identification.

In another embodiment, the sidelink semaphore message may be the identification code of the transmitting user device, thereby indicating the identity of the user device and not relying on the sequence position for identification. In addition, if the message is modulation in BPSK or QPSK, which do not include amplitude modulation, there may be no need for a demodulation reference.

In some embodiments, a newly arriving user device, wishing to join the temporary local network and to communicate with the other user devices, may receive the sidelink semaphore messages of the existing members and may thereby determine their identification codes. The new user device may then select a different code for itself, distinct from the others, and may then transmit its own semaphore message upon the next session of semaphore messages, preferably appending its semaphore message after the other devices have transmitted, and preferably after an LBT interval to detect any unexpected interference and avoid a message collision. Alternatively, the new user device may determine that a gap is present among the other user devices' semaphore messages instead of waiting until the end of the session. The new user device may then transmit its own semaphore in that gap upon the next semaphore session. By transmitting its own sidelink semaphore message, the new user device thereby announces its presence and indicates that it has now joined the temporary local network. When one of the user devices passes out of range of the temporary local network, the exiting user device may fail to detect semaphore messages from the other devices, and may then cease transmitting its own semaphore messages. Likewise, the other user devices of the temporary local network may detect that one of the members' semaphore message is missing. In this way, the members can continually update the evolving membership of the moving temporary local network, even as each individual user device transitions into and out of range.

Figure 4C:
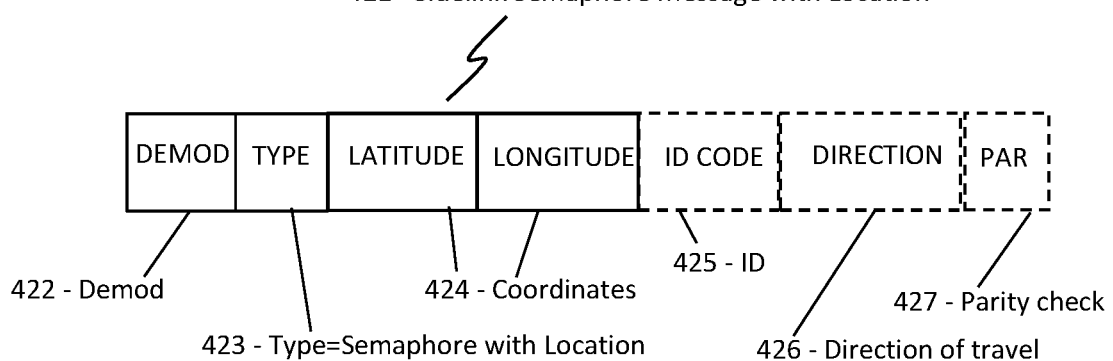
FIG. 4C is a schematic sketch showing an exemplary embodiment of a sidelink semaphore message including location, according to some embodiments.

FIG. 4C is a schematic sketch showing an exemplary embodiment of a low-complexity sidelink semaphore message including location, according to some embodiments. As depicted in this non-limiting example, a sidelink semaphore message with location 421 may include a demodulation reference 422, a message-type field 423 indicating the message type, and the location of the transmitting user device such as latitude and longitude coordinates 424 or codes representing the coordinates. Other user devices receiving the message 421 may thereby determine where the transmitting user device is located, which may be useful when the user devices are, for example, vehicles in traffic. Optionally, the message may include the identification code 425 of the transmitting user device, so that other user devices may determine which member is at which location. Optionally, the message may also include a direction field 426 indicating the direction of travel and optionally also the speed of the transmitting user device, and an optional error-check field 427 such as an 8-bit parity code or a short-form CRC for example. As mentioned, the examples of FIGS. 4A and 4B and 4C are non-limiting; artisans may devise other sidelink semaphore messages with other fields and other sizes, without departing from the appended claims.

An advantage of user devices transmitting sidelink semaphore messages may be that other user devices within radio range may thereby determine which proximate user devices are capable of wireless communication. Another advantage may be that the user devices in range of each other may form a temporary local network by transmitting and receiving their wireless addresses or identification codes. Another advantage may be that the user devices may use the semaphore messages to synchronize their timing and adjust their frequencies to mutually align with each other, for improved reception quality and improved demodulation success. An advantage of transmitting directly to each other, at-will after an LBT delay, on an allocated sidelink frequency or band, may be that the complexity may be greatly reduced relative to communications on scheduled 5G/6G channels under control of a base station. Another advantage may be that a user device may transmit an emergency message much sooner using the low-complexity protocols than with the complex registration and permission procedures required in 5G and 6G managed channels. An advantage of including a demodulation reference at the head of each sidelink semaphore message, may be to assist each receiving user device in demodulating the rest of the message. An advantage of including a message-type field may be to indicate how the message is to be interpreted. An advantage of including an identification code of the transmitting user device in the semaphore message may be to enable other user devices to contact the transmitting user device specifically, by addressing a message to that identification code. An advantage of selecting identification codes randomly may be that each user device in a temporary local network may thereby have a distinct identification code, and may change any code that matches another user's code in the temporary local network. An advantage of indicating a location in the sidelink semaphore message may be to indicate to other user devices where the transmitting user device is located, for example to avoid vehicle collisions. An advantage of indicating the direction of travel may be to assist a vehicle collision-avoidance system in predicting how vehicles are likely to move subsequently. An advantage of providing an error-check value may be to enable receivers to recognize faulted messages and discard them, or request a re-transmission.

Figure 5A:
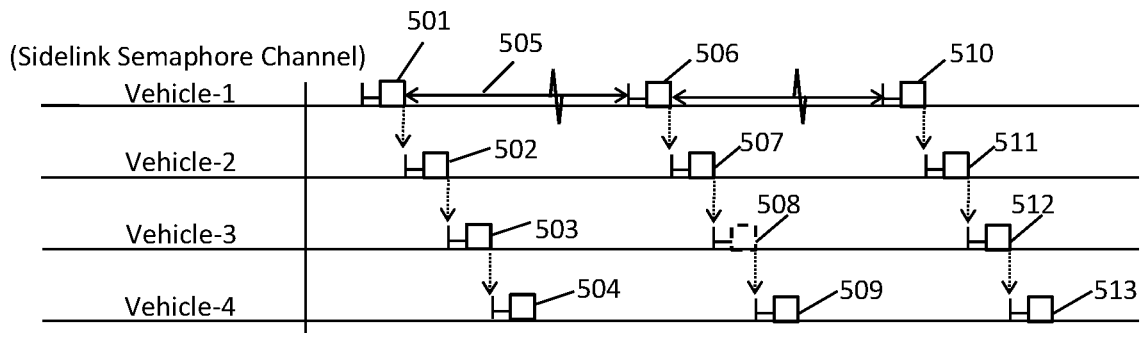
FIG. 5A is a sequence chart showing an exemplary embodiment of a process for a user device to mitigate message collisions, according to some embodiments.

FIG. 5A is a sequence chart showing an exemplary embodiment of a low-complexity procedure for user devices to detect message collisions between sidelink semaphore messages, according to some embodiments. The horizontal lines show sidelink semaphore messages by each of Vehicles 1, 2, 3, and 4 on the sidelink channel. The example shows how a user device can determine whether the user device is transmitting at the same time as another user device, resulting in a message collision. As depicted in this non-limiting example, Vehicle-1 transmits a semaphore signal 501 after an LBT interval (short bar, not specifically labeled). Then Vehicle-2, Vehicle-3, and Vehicle-4 transmit their semaphore messages 502, 503, and 504. After a periodicity delay 505 (substantially longer than implied by the chart; hence the jagged line), Vehicles 1, 2, and 4 repeat their semaphore messages 506, 507, and 509. However, Vehicle-3 omits its semaphore message 508 (in dash) one time, and instead monitors the sidelink channel to determine whether another user device is transmitting its own semaphore message in the same time position. If two user devices transmit their semaphore messages simultaneously, they generally are not able to detect the competing message because receivers cannot detect while the transmitter is transmitting, in most systems of this kind. In the depicted case, Vehicle-3 determines that no other user devices are transmitting at that time, and therefore Vehicle-3 resumes semaphore transmission upon the next semaphore session, along with the other vehicles' messages 510, 511, 512, and 513. If, however, Vehicle-3 had detected another semaphore message in its time position, Vehicle-3 would conclude that the other vehicle's messages had been colliding with those of Vehicle-3. The other user device has somehow begun transmitting in Vehicle-3's time position. Since the two interfering vehicles generally cannot detect the collision when they transmit simultaneously, they may not be aware of the problem. To avoid further confusion, Vehicle-3 may then wait until the other vehicles had finished their semaphore transmissions, and Vehicle-3 may then transmit its semaphore message at some other, unoccupied position, such as at the end of the series of transmissions.

In summary, a member of a temporary local network may detect interference by occasionally withholding its semaphore transmission and monitoring the sidelink channel during that time. If the user device detects another transmission at its regular time, then the user device can seek a different, unoccupied semaphore time position and can resume transmitting at that new time position. Each user device may thereby detect and mitigate semaphore collisions with other user devices. Skipping transmission "occasionally" means skipping one transmission for each N semaphore occasions, where N is either a predetermined number or a random number. In some embodiments, N may be randomly selected in a predetermined range, such as the range of 5 to 100 semaphore sessions. An advantage of the user devices determining at random when to skip transmission, instead of a fixed number, may be to avoid two devices repeatedly monitoring the same time position at the same intervals.

Figure 5B:
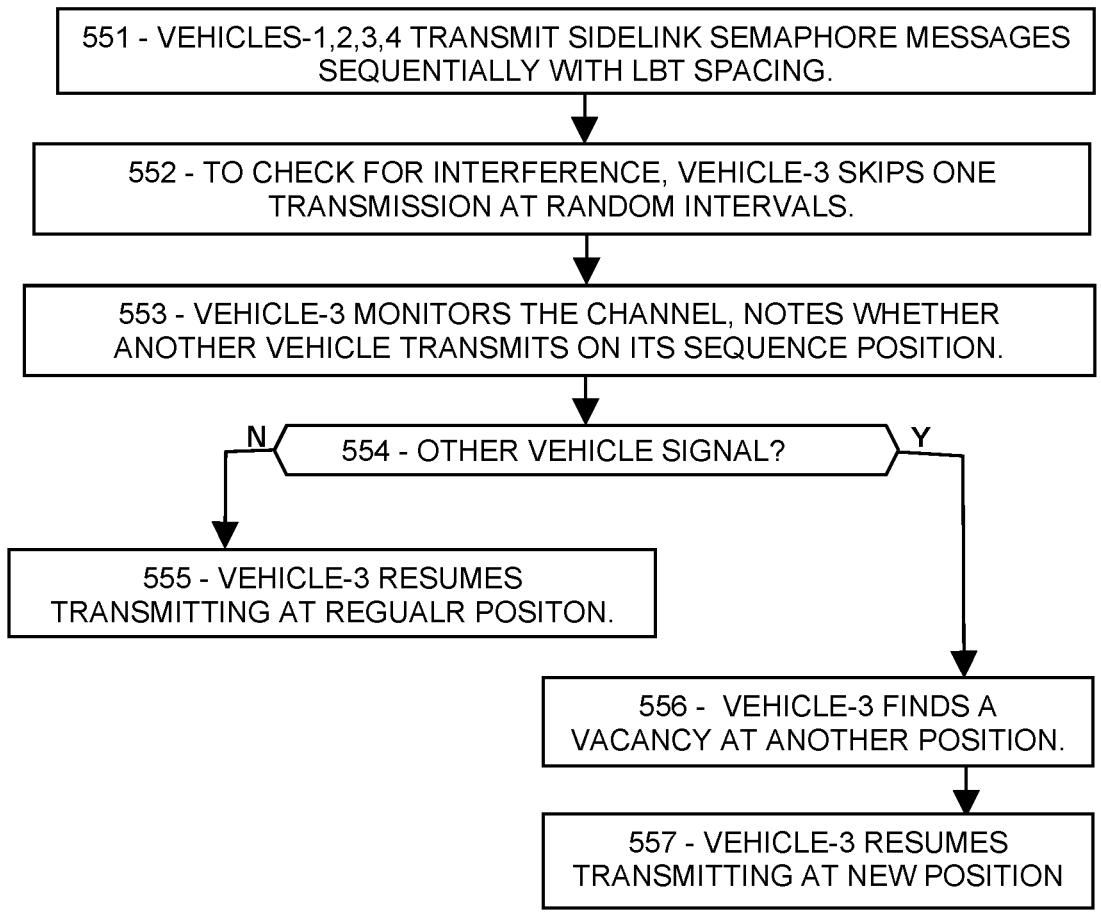
FIG. 5B is a flowchart showing an exemplary embodiment of a process for a user device to mitigate message collisions, according to some embodiments.

FIG. 5B is a flowchart showing an exemplary embodiment of a low-complexity procedure for user devices to detect message collisions on a sidelink channel, according to some embodiments. As depicted in this non-limiting example, at 551, user devices represented as four vehicles, participating in a temporary local network, transmit their sidelink semaphore messages sequentially and spaced apart by LBT intervals to prevent overlap. At 552, at random times, Vehicle-3, omits its transmission. Instead, at 553, Vehicle-3 monitors the channel for any competing signals at its normal position. At 554, Vehicle-3 determines whether another signal is present during its normal transmission position in the sequence of semaphore messages. If not, at 555 Vehicle-3 resumes semaphore signaling upon the next semaphore session. If Vehicle-3 detects an interfering signal during its normal transmission position in the sequence of semaphore messages, then at 556 Vehicle-3 ceases semaphore transmissions and instead determines whether there are other transmission positions not occupied. Such unoccupied transmission positions may be due to a previous user device exiting the local network, for example. At 557, Vehicle-3 determines that the unoccupied position is available, and begins transmitting at that sequence position. If there are no unoccupied sequence positions in the sequence of semaphore messages, Vehicle-3 can wait until the end of the sequence, and then transmit after all the other nodes have transmitted their semaphore messages.

An advantage of detecting message collisions, by omitting a sidelink semaphore transmission on randomly chosen occasions, may be that an interfering semaphore transmission may be detected. An advantage of a new user device searching for an unoccupied semaphore position and beginning its semaphore transmissions at that position, may be that this may avoid message collisions.

The systems and methods further include a low-complexity sidelink channel on which reduced-capability wireless entities can communicate with fewer processing demands and simpler protocols than the managed channels of 5G or 6G. The low-complexity messages may be time-spanning in separate subcarriers, or frequency-spanning in separate symbol periods. Each message may include a leading demodulation reference followed by the rest of the message (the "data" portion of the message). To assist other user devices in receiving the message, the transmitting entity may provide at least one blank resource element, having no transmission, before and after each message.

Figure 6A:
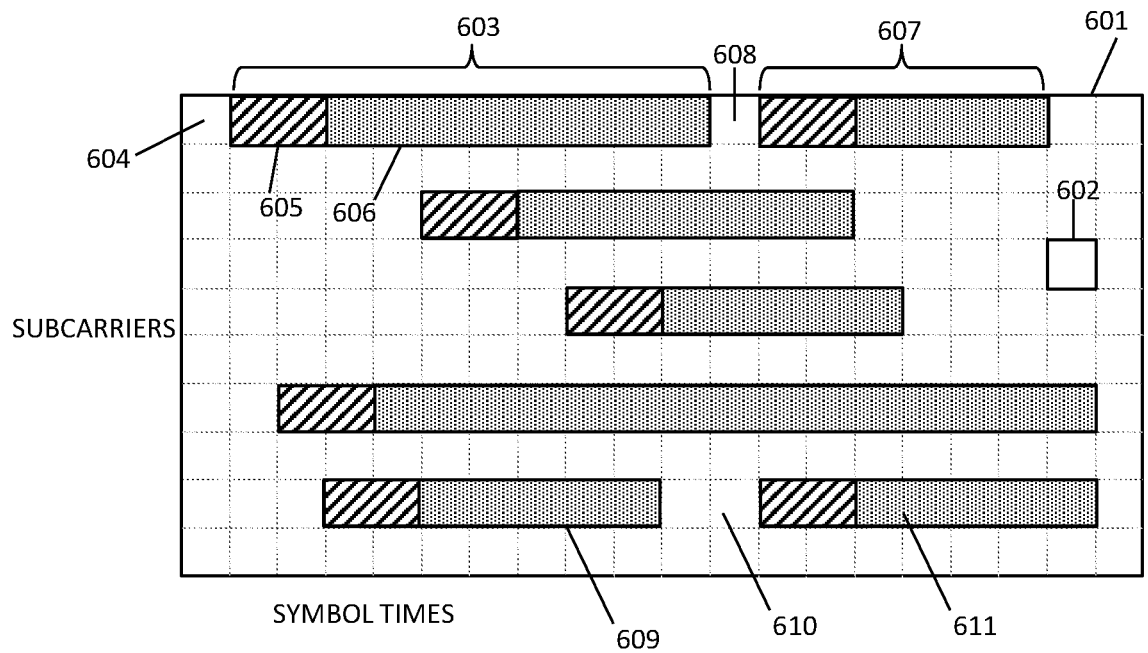
FIG. 6A is a schematic showing an exemplary embodiment of a sidelink resource grid for time-spanning messages, according to some embodiments.

FIG. 6A is a schematic showing an exemplary embodiment of a sidelink resource grid for time-spanning messages, according to some embodiments. In this non-limiting example, a resource grid 601 shows symbol times horizontally and subcarriers (frequency) vertically. A single resource element 602 is indicated. In this example, each subcarrier is 15 kHz wide and each symbol time is 71.4 microseconds long (including cyclic prefix), for compatibility with managed channels at lowest numerology. The resource grid 601 does not have slots or frames or other time divisions other than symbol times. The range in frequency includes an allotted bandwidth for low-complexity time-spanning sidelink messages, and the messages are expected to remain within the allotted band. The resource grid 601, in this example, is reserved for time-spanning messages. In some embodiments, messages may be preceded and/or followed by at least one blank resource element. A blank resource element has no transmission. The blank resource elements between messages may serve as LBT intervals to avoid other messages and interference, and may also enable the receiver to separate successive messages. However, if traffic becomes heavy, additional messages may be transmitted in the remaining subcarriers, accepting that the reception reliability may be somewhat degraded for reduced-capability devices. In addition, a user device may wait a "long LBT" of two blank resource elements before transmitting a "spontaneous" message, that is, not responsive to another message.

A first message 603 is shown time-spanning, that is, occupying a single subcarrier and a number of successive symbol times. The first message 603 follows a blank resource element 604, and includes a leading demodulation reference 605 (diagonal hatch), followed by the remainder of the message 606 (stipple), followed by another blank resource element 608. All of the messages have a similar structure. A second message 607 follows the first message 603 after the blank resource element 608. The first message 603 may be a unicast message and the second message 607 may be a reply from the recipient.

The user devices may be configured to detect message collisions by searching for blank resource elements followed by demodulation references. The user device may have a sufficiently short switching time, from transmit and receive mode, to be able to detect cross traffic in the first symbol time after transmitting, that is, a switching time of less than a symbol period. For example, the user device that transmitted the first message 603 may then monitor at least a portion of the blank resource element 608 and, if it detects a signal, the first user device may conclude that the first message 603 was collided by another, slightly longer, message that started at the same time. If two time-spanning messages start at the same time on the same frequency, they will collide. If one of those message is longer, the other device may detect the longer message continuing after the shorter message is done, and thereby conclude that the messages have collided. The device transmitting the longer message may not be able to detect the collision, but the device that transmitted the shorter message may detect the collision by monitoring the immediately following resource element. This process may be termed LAT or listen-after-transmitting. The device that transmitted the shorter message may then retransmit after the longer message has finished, plus an LBT time of, in this case, two resource elements.

The example also includes a third message 609 and a fourth message 611. In this case, the fourth message 611 is a spontaneous message, and therefore is transmitted after two blank resource elements 610. The two blank resource elements 610 thereby form a long LBT, configured to allow a reply message to take precedence, if desired, after a single blank resource element. Since there is no reply to the third message 609, the fourth message 611 may begin after the long LBT of two resource elements 610 as shown.

Other messages are also shown, each starting at-will but on symbol boundaries and on alternate subcarriers. Since the various user devices may be in motion relative to each other, the relative motion may cause phase variations and frequency shifts, which may degrade the orthogonality between message OFDM symbols if they are transmitted on adjacent subcarriers. Therefore, in this example the messages are transmitted on alternate subcarriers by leaving a blank subcarrier between adjacent messages, thereby accommodating the variable phase and frequency offsets of mobile user devices. The intervening blank subcarriers may also assist reduced-capability devices to process the messages separately. However, as mentioned, under heavy traffic conditions the intervening blank subcarriers may be used to carry additional messages when necessary, with possibly some degradation in reliability.

In some embodiments, the width of the allocated sidelink band may be limited for ease of signal processing. For example, the figure depicts a bandwidth of 150 kHz, with 10 subcarriers at 15 kHz each. In other embodiments, the allocated bandwidth may be narrower, such as 60 kHz allocated with just four 15 kHz subcarriers, which is even less challenging to receive and process. In other embodiments, for small cells or applications having only short and infrequent transmissions, the allocated band may include just a single subcarrier.

In some embodiments, the leading demodulation reference 605 may occupy two resource elements and may have a predetermined default format for each instance of the demodulation reference. For example, the demodulation reference may exhibit the maximum and minimum phase levels and the maximum and minimum amplitude levels of the modulation scheme in the two reference elements. The receiver can calculate the intermediate levels of the modulation scheme from the maximum and minimum by interpolation. For example, the first resource element of the demodulation reference 605 may be modulated according to the maximum amplitude level and the maximum phase level of the modulation scheme, while the second resource element of the demodulation reference 605 may be modulated according to the minimum amplitude level and the minimum phase level of the modulation scheme, among other equivalent combinations. The message data 603 can then be demodulated according to the exhibited and calculated amplitude and phase levels.

If the modulation scheme is QAM16, there are four amplitude levels and four phase levels. The receiver, upon receiving the demodulation reference 605, may interpolate between the maximum and minimum amplitude levels to determine the two intermediate amplitude levels of the modulation scheme, and likewise interpolate between the maximum and minimum phase levels exhibited by the demodulation reference 605, and thereby determine all of the modulation levels by which the message was modulated.

If noise or interference is present, the distortion caused in the message elements generally correspond to the same or similar distortions in the reference elements, and therefore the effects of noise and interference may be mitigated by placing the demodulation reference 605 in close proximity to the data portion 606 of the message. For long messages, a second demodulation reference may be placed at the end, and each element of the message may be demodulated according to a position-weighted average of the two demodulation references, to further cancel current distortions.

If the modulation scheme is QPSK (quadrature phase-shift keying) with four phase levels and only one amplitude level, the intermediate phase levels can be found by interpolation as described, while no amplitude interpolation is necessary for the single amplitude level. For higher modulation schemes such as 64QAM or 256QAM, the intermediate levels in amplitude and phase may be calculated from the maximum and minimum levels exhibited in the demodulation reference as just described. Hence the two-element demodulation reference 605, exhibiting the maximum and minimum amplitude and phase levels of the modulation scheme, may be sufficient to demodulate the message data, and by proximity may mitigate the effects of noise and interference, according to some embodiments.

Since there is no base station, in this embodiment, the symbol timing and subcarrier spacing may be determined by a particular message such as a hailing message. The responding devices may adapt their timing and frequency calibration to the first message. The members of the temporary local network may thereby converge on a common timing and frequency scale.

Figure 6B:
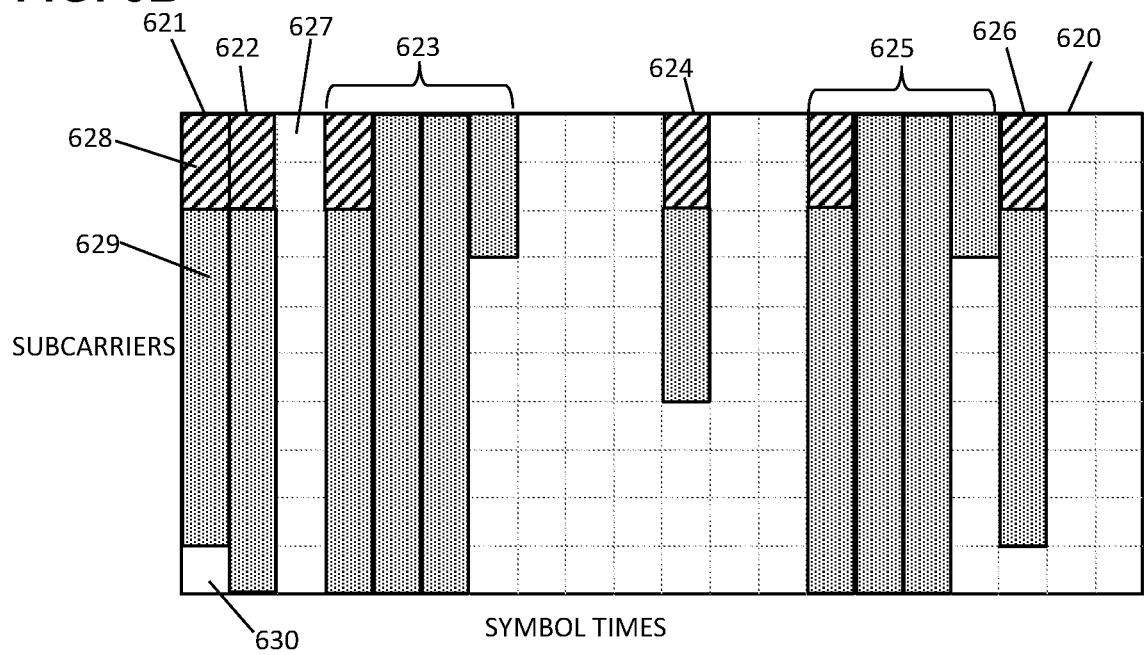
FIG. 6B is a schematic showing an exemplary embodiment of a sidelink resource grid for frequency-spanning messages, according to some embodiments.

FIG. 6B is a schematic showing an exemplary embodiment of a sidelink resource grid for frequency-spanning messages, according to some embodiments. In this non-limiting example, messages are shown frequency-spanning, that is, filling successive subcarrier resource elements at a single symbol time. However, if the message is longer than the width of the allocated band, then the message may continue on the next symbol time, as in a "frequency-first, time-second" arrangement. In the example, each message begins with a demodulation resource in the top two subcarriers, followed by a sufficient number of subcarriers and symbol times to complete the message. Devices are expected to receive and demodulate the full allocated frequency band. Symbols are OFDM (orthogonal frequency-division multiplexing) with standard cyclic prefix and other parameters. If the message is short, it may be finished within the allocated frequency band in a single symbol time. If the message is longer than the number of subcarriers, it continues on the next symbol time, and subsequent symbol times if necessary.

The low-complexity sidelink protocol may enable communications between mobile devices that may be in motion relative to each other. The motion causes frequency and phase shifts that produce signal processing difficulties if multiple devices transmit on adjacent subcarriers at the same time, as is commonly done in the high-performance channels. This problem is avoided, in the depicted example, by arranging that each message begin in the top subcarrier. Thus a particular user device "owns" each symbol time, and another user cannot transmit on that symbol time. Consequently, all of the signals at a particular symbol time have the same motional phase and frequency shifts, and all of the message elements have the same phase and frequency shifts as the reference elements, since they all come from the same transmitter. The amount of signal processing required of the receiver is therefore much less, and the error rate is much lower, than if differently-moving transmitters occupied adjacent subcarriers at the same time.

The figure shows six frequency-spanning messages in a resource grid 620, a first message 621, a second message 622, a third message 623, and three others 624, 625, and 626. Each message begins with a demodulation reference 628 followed by the message data 629, in successive subcarriers. At least one gap, or blank (no transmission) resource element, is provided between messages. The first message 621 does not fill the frequency band. A blank resource element 630 remains at the end of the first message 621, and this satisfies the requirement for at least one blank resource element between messages. Therefore the second message 622 begins in the next symbol time. The second message 622, on the other hand, fills the allocated bandwidth, with no leftover (unoccupied) resource elements. Therefore, a blank symbol time 627 is provided between the second and third messages 622-623. The third message 623 can therefore begin in the next (fourth) symbol time as shown. The third message 623 is longer, spanning the allocated frequency band multiple times.

An advantage of providing a low-complexity sidelink channel for at-will messaging between user devices may be that the registration process of 5G and 6G networks may be avoided. Another advantage may be that an emergency message, such as an imminent-collision alert between vehicles in traffic, may be transmitted much sooner on the low-complexity sidelink channel than on the managed channels, because the transmitting vehicle can transmit the low-complexity message as soon as the danger is detected.

Figure 7:
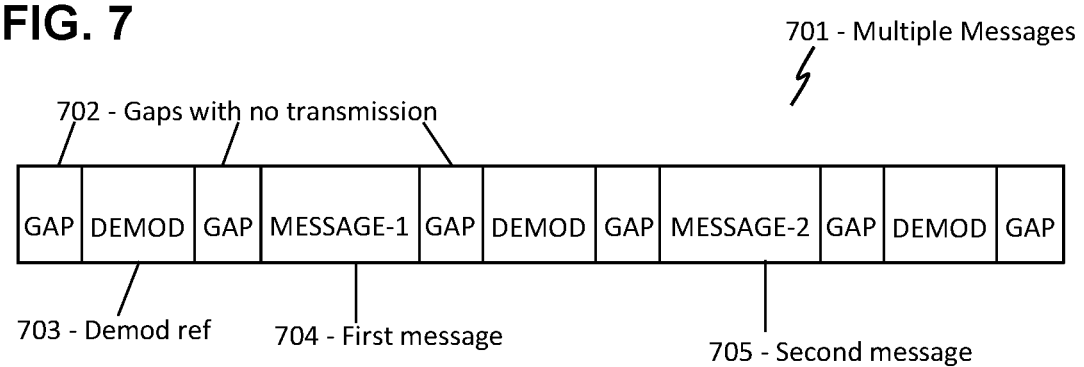
FIG. 7 is a schematic sketch showing an exemplary embodiment of a series of sidelink messages, according to some embodiments.

FIG. 7 is a schematic sketch showing an exemplary embodiment of a series of sidelink messages, according to some embodiments. As depicted in this non-limiting example, a vehicle or other entity transmits a series of messages 701 on a sidelink channel, such as two messages addressed to two different recipients. In this example, the transmitting vehicle has arranged spaces or gaps having no transmission, positioned to enable the recipients to readily determine where the messages begin and end. In addition, demodulation references are added before and after each of the messages.

First, the transmitting entity provides a gap 702 with no transmission during a time when no other wireless activity is detected. Then the transmitting entity transmits a demodulation reference 703 and another gap 702, followed by the first message 704. After the first message 704, the entity provides another gap 702, another demodulation reference 703, and yet another gap 702 before transmitting the second message 705. Finally, the entity provides a gap, another demodulation reference, and a final gap of no transmission, and is finished. Each message 704, 705 is thereby bracketed, before and after, by a characteristic pattern of gap-demodulation-gap which demarks the beginning and ending of each message, and also provides highly localized demodulation references to assist the receiver in demodulating the messages.

In some embodiments, the demodulation references 703 may be short-form demodulation references that exhibit the amplitude and phase modulation levels using few resource elements. For example, the demodulation references 703 may be two resource elements in length, configured to exhibit the maximum and minimum amplitude levels, and the maximum and minimum phase levels, of the modulation scheme. In some cases, the messages may be transmitted in "PAM" (pulse-amplitude modulation) in which each message element is the sum of two amplitude-modulated signals differing by 90 degrees of phase. In that case, the demodulation references 703 can exhibit the extremum amplitude values in the in-phase and quad-phase components, again totaling two resource elements. For each of these modulation schemes, and many other standard modulation schemes, the receiver can readily calculate the intervening amplitude and phase levels by interpolation, and can then demodulate the message by comparing each message element to the amplitude and phase levels thus determined. In addition, since each message 704, 705 is surrounded by two demodulation references 703, the receiver can average or interpolate the amplitude and phase levels of the leading and following demodulation references, and use that interpolated or averaged value to demodulate each of the message elements. Since noise and interference usually affect the demodulation references in the same way as the message element, the averaging or interpolating can mitigate most sources of message faults.

Figure 8:
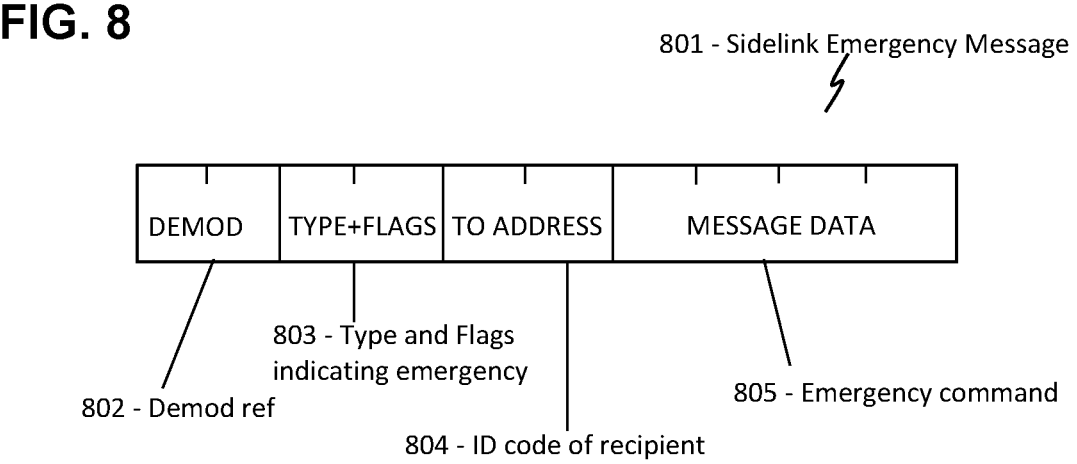
FIG. 8 is a schematic sketch showing an exemplary embodiment of a sidelink emergency message, according to some embodiments.

FIG. 8 is a schematic sketch showing an exemplary embodiment of a sidelink emergency message, according to some embodiments. As depicted in this non-limiting example, a sidelink emergency message 801 may include ten 16QAM resource elements. Resource elements in the emergency message 801 are demarked by little lines in the figure. The example includes a demodulation reference 802 with two resource elements. The resource elements are modulated according to the minimum and maximum phase and amplitude levels of the modulation scheme, which in this case is 16QAM which encodes four bits per resource element. For example, the first resource element may be modulated as the maximum phase level and the maximum amplitude level of the modulation scheme, while the second reference element may be modulation according to the minimum amplitude and phase levels. The intermediate amplitude levels can then be calculated by interpolation between the maximum and minimum amplitude levels exhibited by the demodulation reference 702, and likewise for the phase levels. The message-type field 803 is eight bits (two resource elements in 16QAM), including flags that indicate the message is an emergency message. The address field 804 specifies the eight-bit self-selected ID code of the intended recipient. The message data field 805 includes the message contents of 16 bits. An error-check field is not included because the message is quite short. Acknowledgement is not requested because an emergency message requires acknowledgement by default.

To consider a specific example, vehicles in traffic may have exchanged their identification codes using sidelink hailing or semaphore messages as described above, or otherwise determined their wireless addresses. A first vehicle is being followed by a second vehicle at freeway speeds. A collision could be fatal. Both vehicles are either autonomous or semi-autonomous and are in radio communication on the sidelink channel. Suddenly the first vehicle detects an obstruction and performs a panic stop. However, the second vehicle is likely to run into the first vehicle unless the second vehicle can also stop very quickly. Delays are crucial. To avoid such a collision, the first vehicle transmits a message to the second vehicle, specifying that the message is an emergency message, with the message data of "Stop!". The second vehicle, being timely warned, immediately stops and thereby avoids the collision.

The success of this maneuver depends critically on rapid message transfer. Since timing is extremely tight and lives are at stake, no delays can be tolerated. However, according to 5G or 6G protocols, the first vehicle is required to perform an intricate series of transmission and receptions and other tasks, which include multiple unavoidable delays. If the second vehicle successfully finds and decodes the emergency message, and if the collision has not yet occurred, the second vehicle can then attempt to stop.

In contrast, using low-complexity protocols as described herein, the first vehicle can transmit the emergency message to the second vehicle as soon as the hazard is detected. A major advantage of the low-complexity sidelink channel and protocols disclosed herein is that emergency messages may be communicated directly to the recipient without delay, thereby avoiding or minimizing traffic collisions and saving lives.

5G and 6G have enormous potential for high-end user devices such as computers and mobile phones with advanced software and powerful processors. However, many future communication applications are expected to involve a completely different family of devices, with substantially lower cost, performance, and service demands than past wireless systems. It would be inefficient to establish a separate wireless domain adapted to low-end devices, overlapping and competing with 5G/6G channels, especially since there is only one frequency spectrum which all wireless technologies must inescapably share. Low-demand devices could be upgraded to comply with 5G or 6G standards, but at substantial extra cost which would exclude or substantially attenuate many promising use cases. A much more efficient path forward would be to provide, in 5G and 6G, optional low-complexity procedures which can accommodate devices with far lower performance capabilities than current wireless devices. Low-complexity protocols may be configured to enable such reduced-capability user devices, while minimizing demands on 5G/6G base stations and interference with communications on the scheduled channels. It is possible to provide such low-complexity protocols and low-complexity channels without impacting, or at most minimally impacting, the scheduled network, because reduced-capability devices generally do not require low latency, high reliability, large messages, wide bandwidth, or high usage. On the contrary, most of the emergent IoT applications involve infrequent, short messages transmitted locally by single-purpose sensors or actuators, placing very minimal demands on the network.

The systems and methods disclosed herein are intended to provide such non-interfering low-complexity options. The options described herein include low-complexity protocols for user devices to find, make first contact with, and continue communicating directly with each other. When low-complexity procedures are incorporated in the 5G and 6G standards, these procedures will open opportunities for many low-demand applications involving low-cost wireless devices, applications that would not have been feasible otherwise.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided online and/or wirelessly. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A first user device configured to:
broadcast a sidelink hailing message to other user devices in range, the sidelink hailing message comprising an identification code of the first user device;
receive one or more sidelink reply messages transmitted by one or more other user devices responsive to the sidelink hailing message, each sidelink reply message comprising an identification code of the replying user device;
record the identification code of each replying user device in computer-readable media; and then
communicate with a specific one of the replying user devices;
detect a message collision between two of the sidelink reply messages;
then delay a predetermined interval; and
then retransmit the sidelink hailing message;
wherein the predetermined interval is in the range of 0.01 to 10 seconds, inclusive.

2. The first user device of claim 1, wherein the sidelink hailing message is transmitted according to 5G or 6G technology.

3. The first user device of claim 1, wherein the communicating comprises transmitting a unicast (addressed) message to the specific user device, or receiving a unicast message from the specific user device.

4. The first user device of claim 1, further configured to select an identification code at random or according to a pseudorandom algorithm, and to include the identification code in the sidelink hailing message.

5. The first user device of claim 4, wherein the identification code has a predetermined bit length in the range of 8 bits to 16 bits, inclusive.

6. The first user device of claim 1, further configured to include, in the sidelink hailing message, a code indicating a location of the first user device.

* * * * *